United States Patent [19]

Müller et al.

[11] 4,030,602

[45] June 21, 1977

[54] DEVICE FOR SEPARABLY COUPLING SECTION OF CASSETTES FOR MOTION PICTURE FILM OR THE LIKE

[75] Inventors: Günter Müller; Reimund Kluge, both of Unterhaching, Germany

[73] Assignee: AGFA-Gevaert, A.G., Leverkusen, Germany

[22] Filed: Apr. 7, 1976

[21] Appl. No.: 674,592

[30] Foreign Application Priority Data

Apr. 26, 1975  Germany .......................... 2518762

[52] U.S. Cl. .............................. 206/404; 206/387; 220/8; 220/306; 220/326

[51] Int. Cl.² ................ B65D 85/42; B65D 85/672; B65D 7/24

[58] Field of Search .............. 220/8, 306, 315, 326; 206/1.5, 387, 403, 404

[56] References Cited

UNITED STATES PATENTS

| | | | |
|---|---|---|---|
| 2,129,447 | 9/1938 | Schuler | 220/8 X |
| 2,744,650 | 5/1956 | Woessner | 220/306 X |
| 3,117,691 | 1/1964 | Williams | 220/306 |
| 3,424,341 | 1/1969 | Slapnik | 220/306 |
| 3,858,745 | 1/1975 | Cloyd | 220/306 X |

*Primary Examiner*—William Price
*Assistant Examiner*—Steven M. Pollard
*Attorney, Agent, or Firm*—Peter K. Kontler; John Kurucz

[57] ABSTRACT

The housing of a cassette for motion picture film or magnetic tape consists of two or more sections which are separably coupled to each other by detents each having a preferably elastic toothed hook which is provided on one of the sections and whose tooth or teeth can snap behind one or more shoulders in one or more sockets provided in the other section or sections. The hooks do not project beyond the general outline of the housing when their teeth engage the respective shoulders. The housing may consist of an inner casing which is received in an outer casing having two shells which are separably coupled to each other and/or to the inner casing, or of an inner casing and a one-piece outer casing which receives the inner casing and is separably coupled to the rear end wall of the inner casing.

9 Claims, 4 Drawing Figures

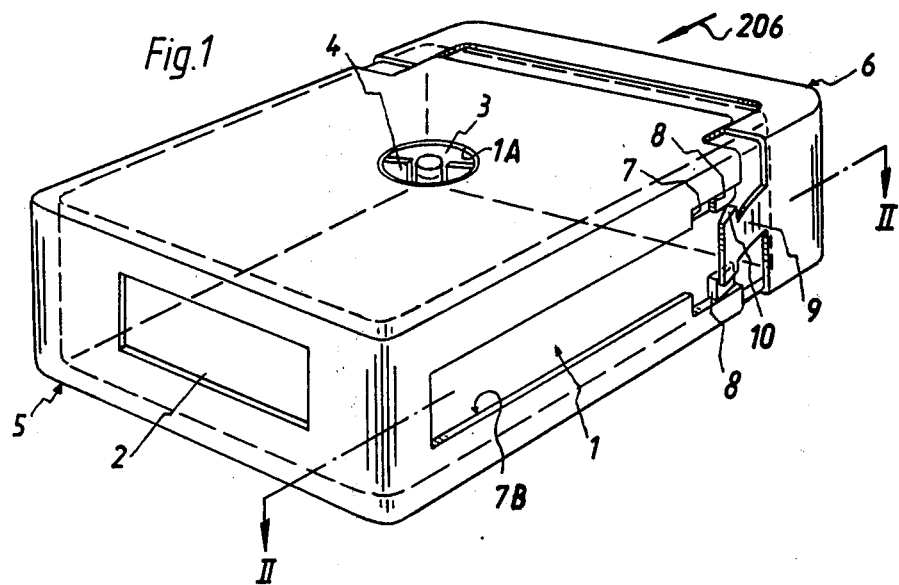
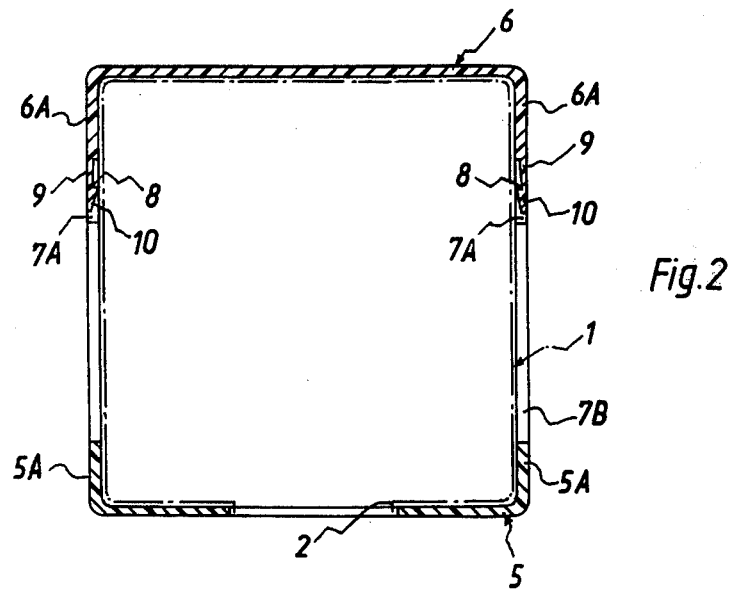

DEVICE FOR SEPARABLY COUPLING SECTION OF CASSETTES FOR MOTION PICTURE FILM OR THE LIKE

BACKGROUND OF THE INVENTION

The present invention relates to magazines or cassettes for elongated webs of flexible material, such as motion picture film or magnetic tape. More particularly, the invention relates to improvements in magazines or cassettes of the type having a composite housing which consists of or comprises two or more separable sections. Still more particularly, the invention relates to improvements in devices (hereinafter called detents) for coupling sections of housings of magazines or cassettes to each other in such a way that the sections can be repeatedly coupled to or separated from each other.

German Utility Model No. 1,865,356 discloses a magazine or cassette for 8-millimeter motion picture film whose housing comprises two shells and a detent which can separably couple the shells to each other. The detent comprises a first cylinder which is provided on one of the shells and has a shoulder for engagement with an annular bead or rib at the periphery of a second cylinder which is provided on the other shell. The two shells of the housing can be separated from each other when the rib of the second cylinder is disengaged from the shoulder of the first cylinder and/or vice versa. A drawback of such detents is that their component parts project well beyond the outline of the housing, i.e., that the detents constitute readily detectable protuberances at the exterior of the cassette.

SUMMARY OF THE INVENTION

An object of the invention is to provide a simple, inexpensive and compact device which can couple two or more separable sections of the housing of a magazine or cassette for motion picture film or the like in such a way that the locus or loci of connection do not or need not extend beyond the general outline of the housing.

Another object of the invention is to provide a device which comprises one or more detents and is configurated in such a way that none of its parts extend appreciably beyond the outline of the housing of a cassette when the device is operative to couple two or more separable sections of the housing to each other.

A further object of the invention is to provide a novel and improved device for separably coupling the inner casing of the housing of a magazine or cassette for 8-millimeter motion picture film or the like with one or more shells which surround and prevent penetration of light into the inner casing, or for separably coupling the shells to the inner casing and/or to each other.

The invention is embodied in a magazine, particularly in a cassette for motion picture film or magnetic tape (e.g., for 8-millimeter motion picture film). The magazine comprises a housing which includes at least two discrete sections and novel means for separably coupling the sections to each other. The coupling means comprises at least one detent having a male detent member (e.g., an elastic hook having one or more teeth or analogous projections) on one of the sections, and a complementary female detent member or socket in the other section. The male detent member is movable (e.g., flexible or pivotable) to and from an operative position in which at least a major portion thereof is received in the socket and in which the detent member couples the one section to the other section.

The other section of the housing is preferably formed with at least one shoulder which bounds a portion of the socket and can be engaged by a projection of the male detent member, preferably by snap action, so that the shoulder cooperates with the projection to normally hold the male detent member in the socket.

The housing may comprise an inner casing which constitutes a first section, and an open-ended outer casing which constitutes a second section and has a chamber for the inner casing. The male detent member may be provided on the inner casing or on the outer casing, e.g., at the open end of the outer casing; the rear end wall of the inner casing is then formed with a socket for the male detent member. Alternatively, the outer casing may consist of two shells which can receive different portions of the inner casing, i.e., the housing may have three sections. The male coupling member of such a housing can be provided on one of the shells and the socket may be provided in the inner casing and/or in the other shell.

The novel features which are considered as characteristic of the invention are set forth in particular in the appended claims. The improved housing itself, however, both as to its construction and the mode of assembling or dismantling the same, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a cassette having a composite housing whose sections can be separably coupled to each other by means of two detents which embody one form of the invention;

FIG. 2 is a sectional view as seen in the direction of arrows from the line II—II of FIG. 1;

DESCRIPTION OF THE PREFERRED EMBODIMENTS

Figure 3:
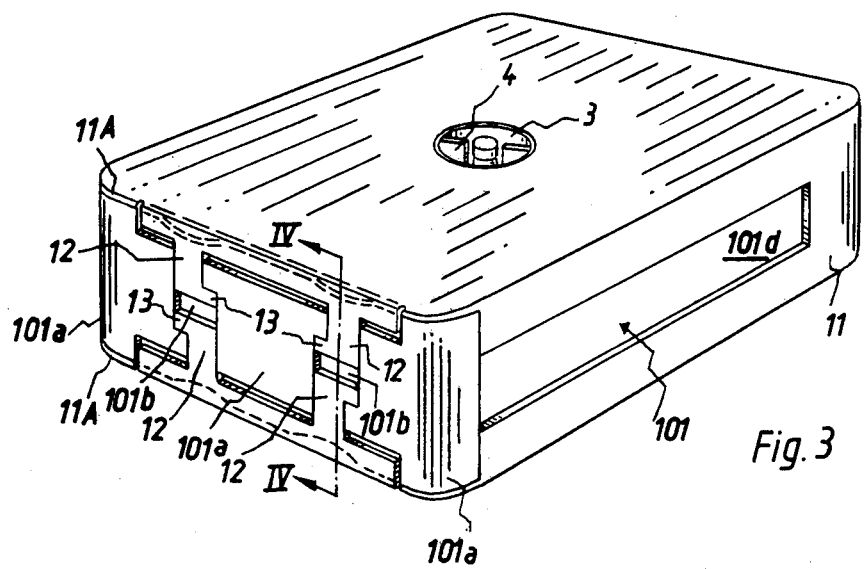
FIG. 3 is a perspective view of a cassette having a composite housing whose sections are separably coupled to each other by means of modified detents.

FIG. 1 shows a magazine or cassette for 8-millimeter motion picture film which comprises a housing including a first section which constitutes a prismatic inner casing 1 having two parallel major walls and two pairs of narrow side walls. One of the narrow side walls has a window 2 which is located in front of a film platform (not shown) and is in register with the picture taking lens of a motion picture camera when the cassette is properly inserted into the camera body. One of the major walls of the inner casing 1 has a circular opening 1A which affords access to the torque receiving portion 4 of one of two coaxial reels or spools in the interior of the cassette. The portion 4 receives torque from the film transporting mechanism of the motion picture camera and drives the takeup reel or spool 3 which collects exposed film frames. The unexposed film frames are stored on the other (supply) reel or spool in the inner casing 1, and such supply reel is rotated in a direction to pay out unexposed film in response to rotation of the takeup reel 3 in a direction to collect exposed film. The inner casing 1 further contains suitable rollers or analogous means for guiding motion picture film during transport in a direction from the core of the supply reel, past the window 2, and toward the core of the takeup reel 3.

The housing of the magazine or cassette of FIGS. 1 and 2 further comprises an outer casing or envelope which closely conforms to the outline of the inner casing 1 and serves to prevent penetration of light into the interior of the casing 1. The outer casing or envelope resembles a box or pack and includes two cupped sections 5 and 6 which are separably coupled to each other by two detents each of which embodies one form of the invention. The section 5 surrounds the major portion of the inner casing 1 and has a window in register with the window 2 as well as an opening in register with the opening 1A. The sections 5 and 6 of the outer casing are normally coupled to each other; they are separated from each other and slipped off the inner casing 1 when the motion picture film in the interior of the casing 1 has been fully exposed, i.e., when the inner casing is to be reloaded with a supply of unexposed motion picture film.

Each of the two detents comprises a male detent member or hook 9 having two projections or teeth 10. The hook 9 forms part of the section 6 and is made of an elastomeric synthetic plastic material so that it normally tends to assume the operative position shown in FIG. 2. The hook 9 then extends into a complementary female detent member or socket 7 which is provided in the section 5 and is bounded in part by two recessed shoulders or edge faces 8. When the sections 5 and 6 are properly slipped onto the inner casing 1, the hooks 9 enter the respective sockets 7 whereby their teeth 10 engage and snap over the adjoining shoulders 8 to thus maintain the outer casing in assembled condition in which the outer casing prevents entry of light into the inner casing 1. The shoulders 8 extend transversely of the direction of movement of the sections 5 and 6 toward each other. The direction of movement of the section 6 toward the section 5 is indicated by arrow 206. The section 6 then surrounds a relatively small portion of the casing 1.

The depth of the sockets 7 and the thickness of the hooks 9 is preferably selected in such a way that the hooks 9 can be fully received in the respective sockets (see FIG. 2), i.e., that the members of the two detents do not extend beyond the general outline of the outer casing when the sections 5 and 6 are properly coupled to each other. The hooks 9 are preferably somewhat smaller than the respective sockets 7 so that there is room (as at 7A) for insertion of a suitable rudimentary tool (e.g., the working end of a screwdriver or a portion of a coin) which can be used to expel the teeth 10 from the respective sockets 7 preparatory to separation of the sections 5 and 6 from each other.

In the embodiment of FIGS. 1 and 2, the detents are adjacent to two narrow side walls of the inner casing 1. However, it is clear that the detents can be adjacent to the two major walls of the inner casing, that the sections 5, 6 can be coupled to each other by a single detent, that the coupling means may comprise three or more detents, or that the male coupling member or members may be provided on the section 5.

The material of the hook 9 may but need not be identical with the material of the major portion of the section 6. Elastomeric hooks are preferred at this time, even though it is possible to use hooks which must be pivoted rather than flexed during movement into as well as during movement from the respective sockets. As shown in FIG. 2, the shoulders 8 in the sockets 7 need not extend all the way to the planes of the adjacent outer sides of the respective panels 5A, 6A of the sections 5 and 6. Each of the hooks 9 may comprise a single tooth 10 or an analogous projection, and each of the sockets 7 may form part of a relatively large cutout 7B in the respective panel 5A of the section 5. When the hooks 9 assume the operative positions shown in FIG. 2, they are located in the common planes of the respective panels 5A, 6A.

If the hooks 9 have portions of different thicknesses, the maximum depth of the sockets 7 preferably equals or even exceeds the maximum thickness of the respective hooks. This insures that the hooks need not extend beyond the outer sides of the respective panels 5A, 6A of the sections 5, 6 when the housing of the cassette is fully assembled, i.e., when the sections 5, 6 surround the inner casing 1 and are properly coupled to each other.

Figure 4:
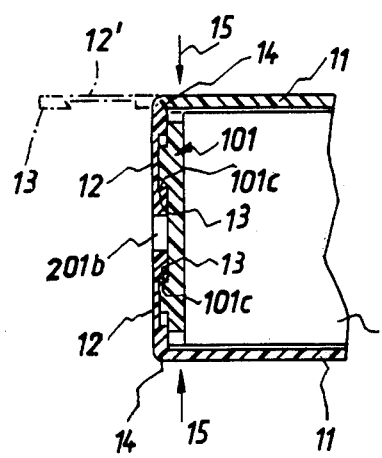
FIG. 4 is a fragmentary sectional view as seen in the direction of arrows from the line IV—IV of FIG. 3.

FIGS. 3 and 4 show a second embodiment of the improved magazine or cassette. This cassette comprises a composite housing including a modified inner casing or section 101 which is received in a chamber of a removable open-ended outer casing or section 11. The outer section or casing 11 surrounds the two major walls as well as three of the four narrow side walls of the inner section or casing 101. The two longer edge faces 11A at the open end of the outer section 11 are formed with pairs of spaced-apart pivotable male detent members or hooks 12. Each hook 12 of one pair is located opposite one hook 12 of the other pair. These hooks preferably do but need not consist of an elastomeric synthetic plastic material. Each of the hooks 12 has a single projection or tooth 13. At least a portion of each hook 12 is preferably thinner than the major part of the outer section 11. The inner side of each hook 12 has a transverse notch 14 which is preferably adjacent to or in register with the respective edge face 11A so that the hooks 12 can be readily pivoted between extended or inoperative positions 12' (indicated in FIG. 4 by phantom lines) and operative positions (FIG. 3) in which they couple the section 11 to the section 101. Thus, those portions of the hooks 12 which are formed with the notches 14 constitute simple hinges which allow for predictable pivoting of hooks 12 to and from operative positions.

A portion of the narrow rear side wall 101a of the section 101 is preferably thicker than the other side walls of this section (see FIG. 4) and is formed with four female detent members or sockets 101b, one for each of the hooks 12, and a portion of each socket 101b is bounded by a narrow edge face of shoulder 101c. When the hooks 12 are pivoted into the respective sockets 101b, their teeth 13 engage and preferably snap behind the respective shoulders 101c whereby the hooks are held in the operative positions shown in FIG. 3. Pivoting of hooks 12 to their operative positions is possible when the outer section 11 is fully slipped onto the inner section 101 so that it prevents penetration of light into the section 101 (except, of course, by way of the window, not shown in FIGS. 3–4, which corresponds to the window 2 of FIG. 1). As shown in FIG. 4, the outer sides of the hooks 12 are preferably flush with the outer sides of the thicker portions of the rear side wall 101a when the hooks are moved to and held in their operative positions. Thus, here again, the members of the detent means need not extend beyond the general outline of the housing of the cassette when the sections 11, 101 are properly coupled to each other.

When the section 101 contains a fresh supply of unexposed motion picture film, it is pushed into the chamber of the open-ended section 11 as far as possible so that the edge faces 11A are flush with the outer side of the rear side wall 101a. The hooks 12 are thereupon pivoted (at 14) to enter into and to be retained in the respective sockets 101b. As mentioned above, retention of hooks 12 in their sockets 101b can be insured by causing the teeth 13 to snap behind the respective shoulders 101c.

The sockets 101b are preferably at least slightly larger than the respective hooks 12 (see 201b in FIG. 4) so that the hooks can be expelled from their sockets by resorting to a rudimentary tool. In fact, two neighboring sockets 101b may form part of a single recess in the outer side of the rear wall 101a of the section 101. Also, the two upper hooks 12 and/or the two lower hooks can be pivoted as a unit. This is clearly shown in FIG. 3.

Instead of resorting to aforementioned tools, the teeth 13 of the hooks 12 can be disengaged from the respective shoulders 101c by applying to the elastically deformable section 11 a relatively small pressure in the direction indicated by arrows 15 shown in FIG. 4. If the hooks 12 are elastic and tend to assume the positions 12', such pressure results in automatic expulsion of hooks from the respective sockets 101b.

The material of the sections 1, 5, 6 and/or 11, 101 is preferably a synthetic plastic substance. However, it is equally within the purview of the invention to make at least the inner section 1 or 101 of a metallic material.

The improved housing is susceptible of many further modifications. For example, the number of hooks and sockets in the housing of the cassette shown in FIGS. 3–4 can be reduced to one, two or three or increased to more than four. Also, the hooks need not be mirror symmetrical to each other, and at least one of these hooks can be provided with two or more teeth to snap into a suitably configurated complementary socket. Furthermore, the hooks and sockets at the rear side wall 101a of the inner section 101 can be provided in addition to one or more detents at the one or both side walls 101d, 101e of the inner section 101. It is equally within the purview of the invention to provide one or more hooks on the section 101 and one or more hooks on the section 11.

Still further, and referring again to FIGS. 1 and 2, each of the sections 5, 6 can be coupled to the inner casing or section 1 by one or more detents. For example, the hooks 9 can be provided on the inner casing 1 and each of the sections 5, 6 is then formed with at least one socket for a hook of the inner casing. Alternatively, one or more hooks 9 can be provided on each of the sections 5, 6 and such hooks can snap into sockets provided in the inner casing 1. If the hooks are provided on the sections 5, 6 and the sockets are formed in the adjacent portions of the inner casing 1, the hooks are preferably flexed or pivoted into the general planes of the respective panels of the sections 5, 6 not later than when they snap into the adjacent sockets. This insures that the members of the detents do not extend beyond the general outline of the outer casing.

Finally, it is also within the purview of the invention to construct the housing of the magazine or cassette of FIGS. 1 and 2 in such a way that one or more hooks of the section 5 or 6 can snap into composite sockets which are provided in part in the section 6 or 5 and in part in the inner casing or section 1 so that a single hook can couple the section 5 or 6 to the section 6 or 5 as well as to the inner casing.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, theefore, such adaptations should and are intended to be comprehended within the meaning and range of equivalence of the appended claims.

What is claimed is:

1. In a magazine, particularly in a cassette for motion picture film or the like, a housing comprising at least two discrete sections; and means for separably coupling said sections to each other, including at least one detent having a male detent member on one of said sections and a socket in the other of said sections, said detent member being movable to and from an operative position in which said detent member extends into said socket and couples said sections to each other, the depth of said socket and the thickness of said detent member being such that the entire detent member is received in said socket in said operative position thereof and the area of said socket being larger than the area of said detent member so that, when moved to said operative position, said detent member fills only a portion of said socket, the unfilled portion of said socket being accessible from the outside of said housing.

2. A housing as defined in claim 1, wherein at least a portion of said detent member consists of elastomeric material and said member has at least one projection, said other section having a shoulder in said socket and said projection engaging said shoulder when said member assumes said operative position.

3. A housing as defined in claim 2, wherein said projection and said shoulder are configurated to normally hold said detent member in said socket.

4. A housing as defined in claim 3, wherein said projection snaps over and is retained by said shoulder in response to movement of said detent member to said operative position.

5. A housing as defined in claim 1, wherein said one section has a hinge for said detent member to permit pivotal movement of said member to and from said operative position.

6. A housing as defined in claim 5, wherein said hinge has a notch about which said member can pivot to and from said operative position.

7. A housing as defined in claim 1, wherein said sections include a first section and a second section which surrounds at least a substantial portion of said first section, said one section constituting one of said first and second sections and said other section constituting the other of said first and second sections.

8. A housing as defined in claim 1, wherein said sections include a first section constituting an inner casing, a second section constituting a first shell which surrounds a first portion of said inner casing, and a third section constituting a second shell which surrounds a second portion of said inner casing, said one section constituting one of said first, second and third sections and said other section constituting another of said first, second and third sections.

9. A housing as defined in claim 8, wherein said shells have substantially coplanar panels and said socket is provided in one of said panels, said male detent member being integral with the other of said panels and being located in the plane of said panels in said operative position thereof.

* * * * *